(12) United States Patent
Bruening et al.

(10) Patent No.: US 6,506,706 B1
(45) Date of Patent: Jan. 14, 2003

(54) POLYAMIDE-CONTAINING LIGATING AGENTS BONDED TO INORGANIC AND ORGANIC POLYMERIC SUPPORTS AND METHODS OF USING THE SAME FOR REMOVING AND CONCENTRATING DESIRED METAL IONS FROM SOLUTIONS

(75) Inventors: Ronald L. Bruening, American Fork, UT (US); Krzysztof E. Krakowiak, Provo, UT (US)

(73) Assignee: IBC Advanced Technologies, Inc., American Fork, UT (US)

( * ) Notice: Subject to any disclaimer, the term of this patent is extended or adjusted under 35 U.S.C. 154(b) by 0 days.

(21) Appl. No.: 09/406,256

(22) Filed: Sep. 27, 1999

(51) Int. Cl.$^7$ ................................................ B01J 20/22
(52) U.S. Cl. ...................................... 502/401; 423/335
(58) Field of Search .......................... 502/401; 423/335

(56) References Cited

U.S. PATENT DOCUMENTS

| | | | | |
|---|---|---|---|---|
| 4,906,379 A | * | 3/1990 | Hodgins et al. | 210/651 |
| 4,943,375 A | | 7/1990 | Bradshaw et al. | 210/674 |
| 4,952,321 A | | 8/1990 | Bradshaw et al. | 210/670 |
| 4,959,153 A | | 9/1990 | Bradshaw et al. | 210/670 |
| 4,960,882 A | | 10/1990 | Bradshaw et al. | 510/468 |
| 5,039,419 A | | 8/1991 | Bradshaw et al. | 210/502.1 |
| 5,071,819 A | | 12/1991 | Tarbet et al. | 502/401 |
| 5,078,978 A | | 1/1992 | Tarbet et al. | 423/22 |
| 5,084,430 A | | 1/1992 | Tarbet et al. | 502/401 |
| 5,096,946 A | | 3/1992 | Rainer | 524/30 |
| 5,173,470 A | | 12/1992 | Bruening et al. | 502/401 |
| 5,179,213 A | | 1/1993 | Bradshaw et al. | 549/3 |
| 5,182,251 A | | 1/1993 | Bruening et al. | 502/401 |
| 5,190,661 A | | 3/1993 | Bruening et al. | 210/670 |
| 5,240,602 A | * | 8/1993 | Hammen | 502/401 |
| 5,244,856 A | | 9/1993 | Bruening et al. | 502/158 |
| 5,273,660 A | | 12/1993 | Bruening et al. | 210/670 |
| 5,393,892 A | | 2/1995 | Krakowiak et al. | 549/214 |
| 6,071,416 A | * | 6/2000 | Bruening et al. | 502/401 |

OTHER PUBLICATIONS

J.M. Graña–Molares, C. Baluja–Santos, A. Alvarez–Devesa et, F. Bermejo–Martinez, pp. 249–252, Étude spectrophotomëtrique des complexes du cobalt (III) avec les amides de l'EDTA et du DTPA.

Lech Przyborowski, Complex Compounds of Amides and Thioamides of Aminopolycarboxylic Acids, Part III*. Synthesis, Properties and Copper (II) Complexes of Nitrilotriacetotriamide and Ethylenediaminetetraacetotetraamide, pp. 1883–1893.

Ritu Kataky, Karen E. Matthes, Patrick E. Nicholson, David Parker and Hans J. Buschmann, Synthesis and Binding Properties of Amide–Functionalized Polyaza Macrocycles, pp. 1425–1990.

Hulisani Maumela, Robert D. Hancock, Laurence Carlton, Joseph H. Reibenspies, and Kevin P. Wainwright, The Amide Oxygen as a Donor Group. Metal Ion Complexing Properties of Tetra–N–acetamide Substituted Cyclen: A Crystallographic NMR, Molecular Mechanics, and Thermodynamic Study, pp. 6698–6707.

* cited by examiner

*Primary Examiner*—Stuart L. Hendrickson
(74) *Attorney, Agent, or Firm*—Thorpe North & Western LLP

(57) ABSTRACT

Compositions and methods for selectively binding metal ions from source solutions are disclosed. The composition is comprised of a polyamide-containing ligand covalently bonded to a particulate solid support through a hydrophilic spacer having the formula SS—A—X—L. In this formula, SS is a particulate solid support such as silica or a polymeric bead, A is a covalent linkage mechanism, X is a hydrophilic spacer grouping, and L is a polyamide-containing ligand having three or more amide groups and two or more amine nitrogens separated by at least two carbons with the proviso that when SS is a particulate organic polymer, A—X may be combined as a single covalent linkage. The separation is accomplished by passing a source solution containing the ions to be separated through a column containing the particulate composition, causing the selected ions to be complexed to the polyamide-containing ligands, and subsequently removing the selected ions from the column by passing an aqueous receiving solution through the column and quantitatively stripping the selected ions from the polyamide-containing ligand.

15 Claims, No Drawings

POLYAMIDE-CONTAINING LIGATING AGENTS BONDED TO INORGANIC AND ORGANIC POLYMERIC SUPPORTS AND METHODS OF USING THE SAME FOR REMOVING AND CONCENTRATING DESIRED METAL IONS FROM SOLUTIONS

FIELD OF THE INVENTION

The present invention relates to polyamide-containing ligands covalently bonded to inorganic and organic solid supports and methods of using the same for removing, separating and concentrating certain desired metal ions from solutions, even when the desired ions are in the presence of other metal ions and/or hydrogen ions at much higher concentrations.

BACKGROUND OF THE INVENTION

Effective methods for the separation and recovery of particular ions such as the transition, post-transition and alkaline earth metal ions from solution mixtures containing these and other metal ions are of great importance in modern technology. Particularly, it is difficult to separate and recover certain metal ions such as $Cd^{2+}$, $Pb^{2+}$, $Ag^+$, $Ni^{2-}$, $Co^{2+}$, $Fe^{3+}$, $Cu^{2+}$, $Sr^{2-}$, and/or $Ca^{2+}$ from the presence of even moderate amounts of hydrogen ion ($H^+$). It is also very difficult to remove the mentioned desired metal ions when present at low concentrations in solutions that contain other, non-desirable metal ions at much greater concentrations. Thus, there is a real need for a composition of matter and an associated method that may be used for selectively separating certain transition, post-transition, and alkaline earth metal ions from other non-desirable ions.

It is known that ethylenediaminetetraacetamide (EDTAA), diethylenetriaminepentaacetamide (DTPAA), and nitrilotriacetamide (NTAA) form strong complexes with various metal ions in solution. These molecules may be shown as Formulas 1–3 respectively below:

Formula 1

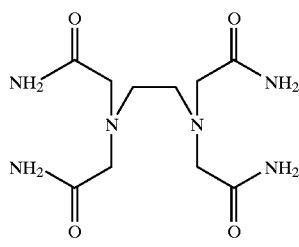

EDTAA

Formula 2

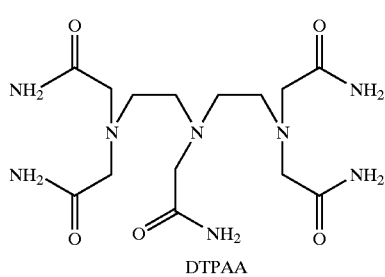

DTPAA

Formula 3

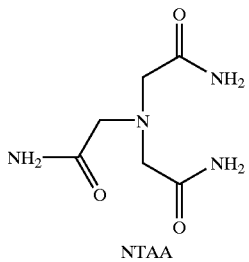

NTAA

J. M. Grana-Molares, C. Baluja-Santos, A. Alvarez-Devesa and F. Bermejo-Martinez, *Etude Spectrophotometrique des Complexes du Cobalt(III) avec les Amides de l'EDTA et du DTPA*, Analysis, Volume 7, 249–252 (1979) (report on the synthesis of EDTAA and DTPAA and their ability to complex Co(III) as shown by a spectrophotometric technique). In a different study, L. Przyborowski showed that NTAA and EDTAA could be prepared by modifying known methods and that Cu(II) formed strong complexes with NTAA. L. Przyborowski, *Complex Compounds of Amides and Thioamides of Aminopolycarboxylic Acids, Part III. Synthesis, Properties and Copper(II) Complexes of Nitrilotriacetotriamide and Ethylenediaminetetraacetotetraamide*, Roczniki Chemii, Volume 44, 1883–1893 (1970).

More recently, a great deal of research has been done in the synthesis and metal ion complexation properties of polyamide-containing azacrown ethers such as those containing acetamide, propionamide, and peptide side arms. R. Kataky, K. E. Matthes, P. E. Nicholson, D. Parker and H-J. Buschmann, *Synthesis and Binding Properties of Amide-Functionalized Polyazamacrocycles*, Journal of the Chemical Society, Perkin Transactions 2, 1425–1432 (1990) (reported on the synthesis and complexation properties of per-N-(dimethylacetamido)-substituted triaza-9-crown-3, aza-12-crown-4, diaza-12-crown-4, and tetraaza-12-crown-4). The ligating agents 1,4,7,10-tetrakis(N,N-dimethylacetamido)-1,4,7,10-tetraazacyclododecane and 1,7-dioxo-4,10-bis(N,N-dimethylacetamido)-4,10-diazacyclododecane are two chemical structures that were synthesized and which are representative of polyamide-containing ligating agents of the present invention. These ligating agents are shown respectively below in Formulas 4 and 5:

Formula 4

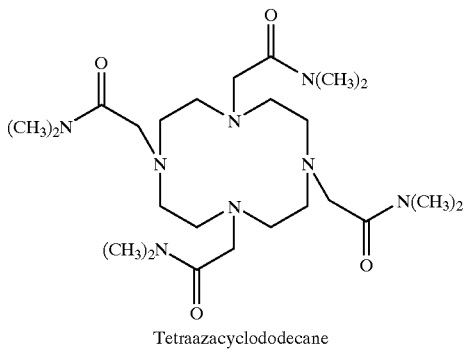

Tetraazacyclododecane

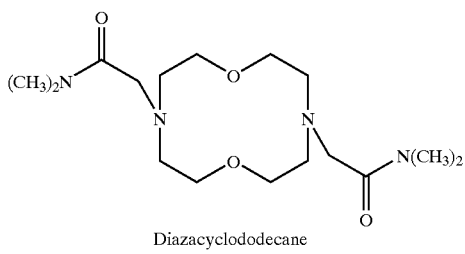

Formula 5

Diazacyclododecane

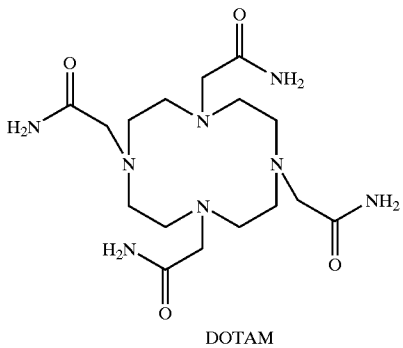

Formula 8

DOTAM

The diamide of Formula 5 was shown to form complexes with all of the alkali metal and alkaline earth metal cations. Further, this diamide was shown to have significant selectivity for $Ca^{2+}$ over the other cations studied. However, a diamide similar to that of Formula 5, but containing one more methylene group in each amide-containing arm (thus, having two N,N-dimethylpropioamido substituents), was shown to form weaker complexes with these same metal ions.

Further studies of amide ligands such as those depicted by formulas 4 and 5 have concluded that the size of the metal ion-ligand chelate ring determines the strength of the interaction between the ligand and the metal ions. For example, a five-membered ring favored the smaller cations over a six-membered ring. Representative of fully chelated metals (Me) having five- and and six-membered amide rings attached are shown in Formulas 6 and 7 respectively below:

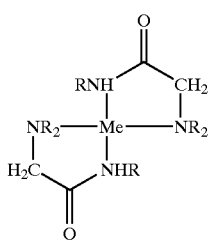

Formula 6

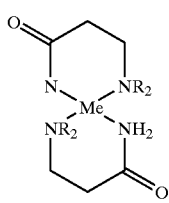

Formula 7

H. Maumela, R. D. Hancock, L. Carlton, and J. H. Reibenspies and K. P. Wainwright, *The Amide Oxygen as a Donor Group. Metal Ion Complexing Properties of Tetra-N-Acetamide Substituted Cyclen: A Crystallographic, NMR, Molecular Mechanics and Thermodynamic Study*, Journal of the American Chemical Society, Volume 117, 6698–6707 (1995). Further, in this article, the authors reported the synthesis of 1,4,7,10-tetraazacyclododecane (DOTAM) which is the unsubstituted amide analogue of the tetraamide of Formula 4. DOTAM is capable of forming complexes with a host of metal ions including many transition and post-transition metal ions. DOTAM also forms strong complexes with $Cd^{2+}$ and $Pb^{2+}$, even at pH levels as low as 0.3 which is equivalent to a hydrogen ion concentration of 0.5 Molar. DOTAM may be represented by Formula 8 below:

The articles cited above disclose procedures for synthesizing and demonstrating limited useful complexation properties of polyamide-containing ligand molecules. However, researchers have not previously been able to incorporate polyamide-containing ligands into solid phase separation systems. This is significant because polyamide-containing ligands present merely as a solute in solution act to complex selected ions, but provide no means for their separation. Specifically, never before have polyamide-containing ligands been successfully covalently bonded to porous and/or non-porous organic and/or inorganic solid supports. Therefore, it would be useful to provide a polyamide-containing ligand attached to a solid support so that these and other polyamide-containing ligands could be used to separate out desired metal ions.

SUMMARY OF THE INVENTION

The present invention is drawn to novel porous and/or non-porous particulate organic and/or inorganic solid supports covalently bonded to polyamide-containing ligands. When an inorganic solid support is used, the solid support is bonded to the polyamide-containing ligand through a covalent linkage mechanism and a hydrophilic spacer grouping. When the particulate solid support is an organic resin or polymer, the polyamide-containing ligand may be bonded directly to an activated polar group on the polymer through a covalent linkage mechanism.

The unique composition of matter of this invention comprises polyamide-containing ligands having three or more amide groups ($NHC(O)CH_2$), two or more amine nitrogens separated by at least two carbons and at least one solid support linkage.

The invention is also drawn to the concentration and removal of certain desired divalent metal ions including transition, post-transition, and alkaline earth metal ions. The present invention is particularly useful for removing such ions as $Cd^{2+}$, $Pb^{2+}$, $Ag^+$, $Ni^{2+}$, $Co^{2+}$, $Fe^{3+}$, $Cu^{2+}$, $Sr^{2+}$, and/or $Ca^{2+}$ from source solutions. This is true whether the desired ions are present at very low or very high concentrations, i.e., from ppb to g/l.

The concentration of desired ions is accomplished by forming a complex of desired ions with a polyamide-containing ligand covalently bound to a solid support material by flowing a source solution containing the desired ions through a column packed with polyamide-containing ligand bound solid support material. This process enables the desired ions to complex with the polyamide-containing ligand attached to the solid support. The metal ion and the polyamide-containing ligand are then decoupled by flowing a receiving liquid through the column (in much smaller volume than the volume of source solution passed through the column) to remove and concentrate the desired ions in the receiving liquid solution. The receiving liquid or recovery solution forms a stronger complex with the desired ions than does the polyamide-containing ligand, or alternatively, temporarily forms a stronger interaction with the polyamide-containing ligand than does the desired metal ions. In either case, the desired metal ions are quantitatively stripped from the ligand in a concentrated form in the receiving solution. The recovery of desired ions from the receiving liquid may be accomplished by various methods commonly known in the art including evaporation, electrowinning, and precipitation among others.

DETAILED DESCRIPTION OF THE INVENTION

The compositions of the present invention comprise polyamide-containing ligands that are covalently bonded to an inorganic or organic solid support through a spacer and are represented by Formula 9 as follows:

Formula 9 wherein SS is a solid support, A is a covalent linkage mechanism, X is a hydrophilic spacer grouping, and L is a polyamide-containing ligand.

The SS—A—X— portion of Formula 9 is well known for use with ion binding ligands. Preferably, the solid support (SS) is an inorganic and/or organic particulate support material selected from the group consisting of silica, silica gel, silicates, zirconia, titania, alumina, nickel oxide, glass beads, phenolic resins, polystyrenes, and polyacrylates. However, other organic resins or any other hydrophilic organic and/or inorganic support materials meeting the above criteria can also be used.

The use of organic ion binding ligands attached to an S—A—X— solid support by means of a covalent linkage spacer grouping is illustrated in U.S. Pat. Nos. 4,943,375; 4,952,321; 4,959,153; 4,960,882; 5,039,419; 5,071,819; 5,078,978; 5,084,430; 5,173,470; 5,179,213; 5,182,251; 5,190,661; 5,244,856; 5,273,660; and 5,393,892. These patents, which disclose various spacers that can be used in forming an organic ligand attached to a solid support, are incorporated herein by reference.

When the solid support (SS) is an inorganic material such as silica, silica gel, silicates, zirconia, titania, alumina, nickel oxide, or glass beads, the covalent linkage (A) is a silane such that A—X may be represented by Formula 10 as follows:

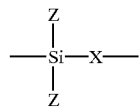

Formula 10 where each Z is independently selected from the group consisting of Cl, Br, I, lower alkyl, lower alkoxy, substituted lower alkyl or substituted lower alkoxy and S (as used herein, lower alkyl or lower alkoxy means a group having 1 to 8 carbon atoms); and X is a spacer grouping represented by Formula 11 as follows:

Formula 11 wherein $R^1$ is a member selected from the group consisting of H, SH, OH, lower alkyl, and aryl; a is an integer from 2 to about 10; and b is 0 or 1. In Formula 11, the terminal carbon (or —CH$_2$— group most distal to the solid support) may attach to the polyamide-containing ligand by any suitable bond. However, it is preferred that the terminal carbon on the spacer be covalently bonded to a nitrogen or another carbon present on the ligand.

Often, the terminal carbon on the spacer (X) will bond to either the carbon or the nitrogen found on an amide group of the polyamide-containing ligand. For example, if the ligand has 4 amide groups, one may be used to attach the ligand to the spacer (X) leaving 3 amide groups available for complexing desired ions. If the terminal carbon on the spacer (X) is to bond to an amide group of the ligand (L), Formula 12 below is representative of such an amide group:

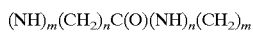

Formula 12 where m is 0 or 1; and n is 0 or 1 with the proviso that when m is 1, n is 0 and when m is 0, n is 1. Thus, the terminal carbon can either covalently bond to a nitrogen or a carbon atom of the amide group.

Conversely, the spacer (X) does not have to bond to an amide group at all. In some embodiments, the spacer (X) bonds directly to a nitrogen or carbon atom or other appropriate atom that is not part of an amide group. In other embodiments, the SS—A—X— portion will attach to the polyamide-containing ligand by replacing one of the amide groups. Therefore, the attachment of the spacer (X) to the polyamide-containing ligand (L) should be limited only by functionality.

When the particulate solid support (SS) is an organic resin or polymer, such as phenolic resins, polystyrenes, and polyacrylates, it will generally be a hydrophilic polymer or polymer derivatized to have a hydrophilic surface and contain polar functional groups. The polyamide-containing ligand (L) will then generally contain a functional grouping reactive with an activated polar group on the polymer. The covalent linkage (A) and the spacer (X) will then be integrated, and may actually be a single linkage, formed by the reaction between the activated polar group from the polymer and the functional group from the ligand and may be represented by Formula 13 below:

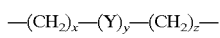

Formula 13 where x is 0 or 1; y and z are independently 0 or an integer from 1 to 10; and Y is a functional group or aromatic linkage such as an ether (O), sulfide (S), imine (C=N), carbonyl (CO), ester (COO), thioester (CSO), amide (CONH), thioamide (CSNH), amine (NH), lower alkylamine (NR), sulfoxide (SO), sulfone (SO$_2$), sulfonamide (SO$_2$NH), phenyl (C$_6$H$_4$), benzyl (CH$_2$C$_6$H$_4$), and the like. At least one of x, y or z must be 1.

The polyamide-containing ligand (L) of the present invention is meant to include any ligand having three or more functional amide groups (NHC(O)CH$_2$) capable of complexing with the desired metal ions and two or more amine nitrogens separated by at least two carbons. Representative examples of polyamide-containing ligands that have at least three amide groups and two or more amine nitrogens separated by at least two carbons include: ethylene bis (oxyethylenenitrilo)tetraacetic acid (EGTAM), diaza-18-crown-6-tetraamide, ethylenediaminetetraacetamide-N-methylenepropanetetraamine (EDTAAMT), tris(2- aminoethyl)amine pentaamide (TRENPAM), and diethylenetriaminepentaacetamide (DTPAM). This list is intended only to be representative of the possible ligands that may be used, the limiting factor being the presence of at least three amide groups and at least two amine nitrogens separated by two or more carbons. Further variations of these ligands may also be used. For example, tris(2-aminoethyl)amine pentaamide (TRENPAM) may be alkyl or aryl substituted as illustrated in Examples 4B (dimethyl substituted) and 4C (phenyl substituted) respectively.

It is to be emphasized that the present invention does not reside in the discovery of the SS—A—X— portion of Formula 9. Rather, it is the discovery that the ion-binding and separation capabilities of the polyamide-containing ligand, when attached to an SS—A—X based solid substrates, are optimized.

As summarized above, the present invention is drawn to a novel composition of matter comprising polyamide-containing ligand molecules covalently bound to solid support materials to form the compounds of Formula 9. However, the invention is also drawn to methods for the preferential separation, removal, and concentration of certain desired metal ions, such as certain transition, post-transition, and alkaline earth metal ions from solution. The solution from which the desired ions may be removed may contain other metal ions or hydrogen ions present at greater concentrations than the desired ions. For example, $Cd^{2+}$, $Pb^{2+}$, and $Ag^+$ may be removed from acidic and or highly chelative matrices and $Ni^{2+}$, $Co^{2+}$, $Fe^{3+}$, $Cu^{2+}$ and $Ca^{2+}$ may be removed from slightly acidic to neutral pH matrices and from chelating matrices.

Moreover the above described ligands covalently bonded to solid supports as shown in Formula 9 provide a means for separating ppb to ppm levels of $Cd^{2+}$ and $Pb^{2+}$ from concentrated acid solution by using the separation techniques and equipment generally known in the art.

The method for separating and recovering desired ions is accomplished by forming a complex of the desired ions with a polyamide-containing ligand bonded to the solid supports. Specifically, this is accomplished by flowing a source solution containing the desired ion(s) through a column packed with polyamide-containing ligands bonded to the solid supports in order to complex or chelate the desired metal ion(s) to the polyamide ligand portion of the structure shown in Formula 9. Subsequently, the desired cation which is bound to the polyamide-containing ligand is released by flowing a complex-breaking receiving liquid in much smaller volume than the volume of source solution originally passed through the column. This removes and concentrates the desired ions in the receiving liquid solution by either (a) forming a stronger complex with the desired transition, post-transition or alkaline earth metal ion(s) than does the polyamide-containing ligand, or (b) temporarily forming a stronger interaction with the polyamide-containing ligand than does the desired metal ion(s), and thus, the desired metal ion(s) are quantitatively stripped from the polyamide-containing ligand solid support compound in concentrated form in the receiving solution. The recovery of a desired metal ion(s) from the receiving liquid is accomplished by evaporation, electrowinning, precipitation, or by other known methods.

The following examples should not be considered as limitations of the present invention, but are merely intended to teach how to make the best known polyamide-containing solid supports based upon current experimental data.

EXAMPLES

Examples 1–4D
Synthesis of Polyamide-Containing Ligating Agents Bonded to Solid Supports Examples 1–4D demonstrate representative structures of solid supports bonded to polyamide-containing ligands. All of these examples have several characteristics in common including: 1) each have 3 or more amide groups capable of complexing or chelating desired ions; 2) each have 2 or more amine nitrogens separated by at least 2 carbons; and 3) each has at least one solid support linkage.

Example 1

Synthesis of Dioxatetraamide [Ethylene Bis (Oxyethylenenitrilo)Tetraaceticacid (EGTAM)] Attached to a Silica Support

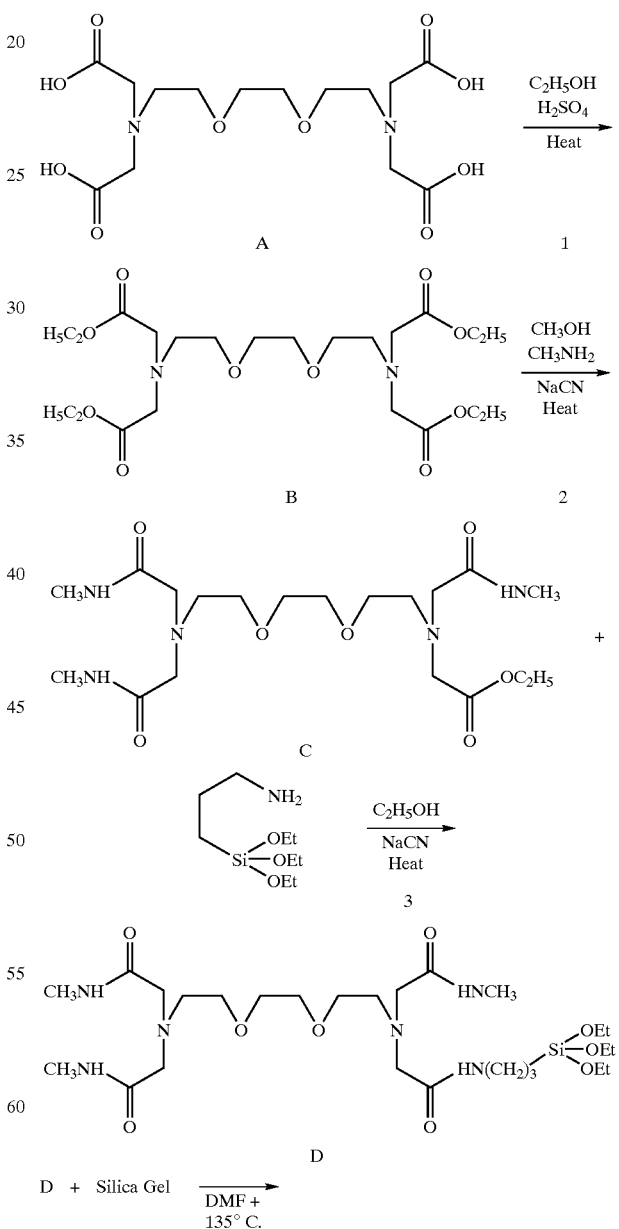

-continued

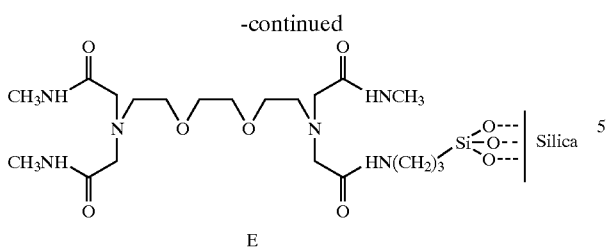

E

Step 1—About 39.2 g of ethylene glycol-bis(β-aminoethyl ether)-N,N,N',N'-tetraacetic acid (A) (0.1 mole), 1.5 L of ethanol, and 15 mL of sulfuric acid were added to a 2 L three-neck round bottom flask. The flask was equipped with a Soxhlet extraction apparatus containing 1:1 magnesium sulfate and sodium sulfate as a drying reagent. The mixture was refluxed and the drying reagent replaced every 12 hours. After refluxing 1–2 days, the system became homogeneous. It was then refluxed for another 8 hours. Next, the system was cooled to room temperature and the ethanol was removed by evaporation. About 10% sodium carbonate aqueous solution was added to adjust the pH of the system to about 8. The resulting solution was extracted 3 times with chloroform. The organic layer was separated and dried by adding magnesium sulfate. The chloroform was then removed under reduced pressure to concentrate the product. The residue was purified by chromatography (silica gel, ethyl acetate) to afford 34.8 g (68.5%) of ethylene glycol-bis(β-aminoethyl ether)-N,N,N',N'-tetraacetic acid ethyl ester (B) as a colorless liquid. Characterization was done by NMR under the following conditions: $^1$H NMR (300 MHz, deuteriochloroform) δ4.2 (q,8 H), 3.6 (t, 12 H), 3.5 (s, 4 H), 1.2 (t,12 H); FABMS 493 (M$^+$).

Step 2—About 69.6 g of the tetraester (B) above, (0.14 mole), 212 mL of 2.0 M methylamine solution in methanol, and 2.08 g of sodium cyanide as a catalyst were added to a 250 mL sealed glass reactor. The mixture was refluxed for 2 days. Methanol was removed by evaporation. The residue was dissolved in 1 L of chloroform, and washed with 200 mL of water to remove the water soluble tetraacetate. The chloroform layer was separated and dried by adding magnesium sulfate. About 27.0 g of the triacetamide (C) was obtained. Characterization was done by NMR under the following conditions: $^1$H NMR (300 MHz, deuteriochloroform) δ7.4 (d, 3 H), 3.5–3.2 (m, 14 H), 3.0 (s 3 H), 2.6–2.4 (m,11 H); IR 1725 cm$^{-1}$ (carbonyl group of ester), 1660 cm$^{-1}$ (carbonyl group of amide); FABMAS 457 (M$^-$Na$^+$).

Step 3—About 27.0 g (0.06 mole) of the triacetamide (C), 66.0 g (0.3 mole) of triethoxysilyl propyl amine, 20 mL of ethanol and a catalytic amount of sodium cyanide were added to a 250 mL sealed glass reactor. The mixture was refluxed for 2 days. The IR spectra of the reaction mixture showed that the signal (1773 cm−1) from the carbonyl group of the ester disappeared and only the signal (1660 cm−1) from the carbonyl group of the amide remained. The solvent was removed by a rotary evaporator. The excess triethoxysilyl propyl amine was then removed by evaporation in a vacuum chamber, 70° C./1 mm Hg. About 54.0 g of ethylene glycol-bis(β-aminoethyl ether)-N,N,N'-[tris(N-methylacetamide)],N'-triethoxysilanepropylaminocarbonylmethylene (D) was obtained.

Step 4—About 54.0 g of ethylene glycol-bis(β-aminoethyl ether)-N,N,N'-[tris(N-methylacetamide)], N'-triethoxysilanepropylaminocarbonylmethylene (D), 54.0 g of silica gel, and 500 mL of N,N-dimethyl formamide were added to a 1 L-three neck round bottom flask. The flask was equipped with a mechanical stirrer, a condenser and a thermometer. The temperature of the mixture was maintained at 135° C. After stirring for 2 days, the reaction mixture was filtered. The resulting tetraamide ligand functionalized silica gel (E) was washed with methanol several times then dried in a vacuum oven at 50–60° C. for 6 hours. About 71.0 g of product E was obtained.

Example 2

Synthesis of Diaza-18-crown-6-Tetraamide Attached to a Silica Solid Support

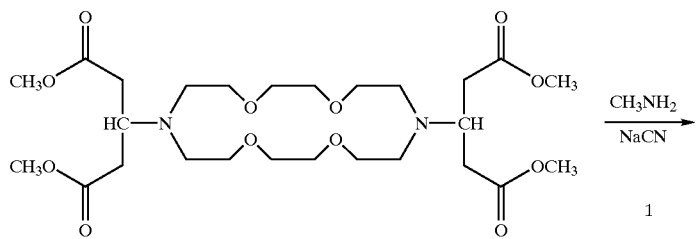

A

-continued

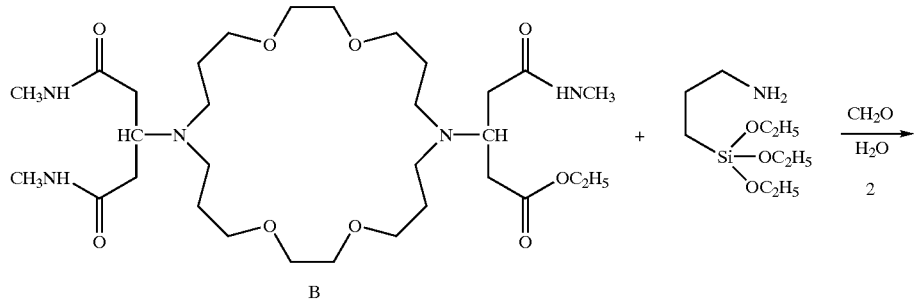

B

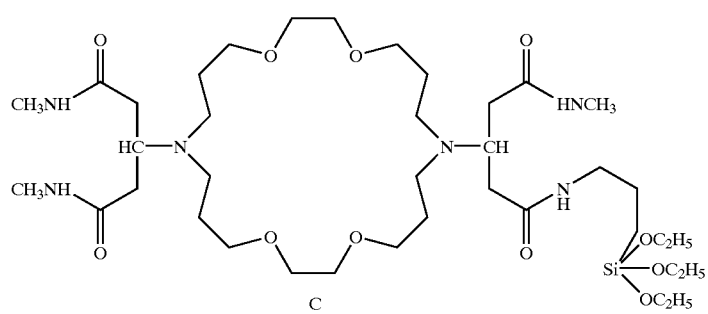

C

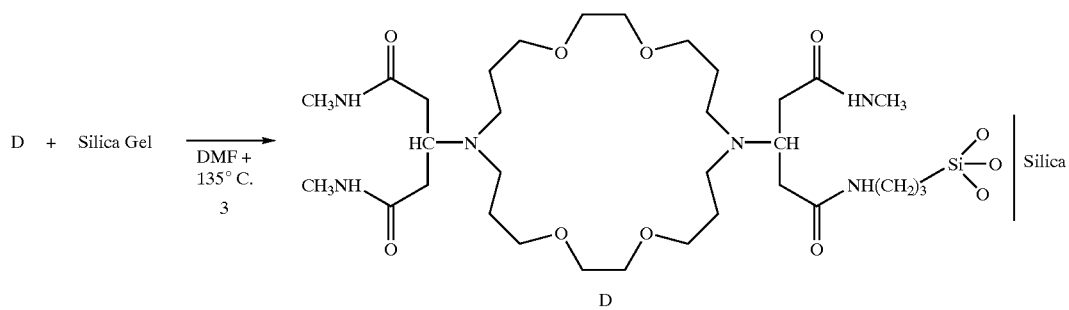

D

Tetraester of diaza-18-crown-6 prepared as published: de Jong et. al., J. Chem. Soc., 102 (1983), pg. 164.

Step 1—About 2.61 g of the 7,16-bis(dicarboxymethyl)-1,4,10,13-tetraoxa-7,16-diazacyclooctadecane tetramethyl ester (A), 18 ml of 1.0 M methylamine solution in methanol and 0.1 g of sodium cyanide as a catalyst was added to a 25 ml sealed glass reactor. The mixture was refluxed for 2 days. Methanol was removed by evaporation. The residue was dissolved in 0.1 L of chloroform and washed with 20 mL of water. The chloroform layer was separated and dried by adding magnesium sulfate. About 2.2 g of product B was obtained.

Step 2—About 2 g of the triacetamide (B) from Step 1, 2.7 g (0.015 mole) of triethoxysilyl propyl amine, 20 mL of ethanol, and a catalytic amount of sodium cyanide were added to a 25 mL sealed glass reactor. The mixture was refluxed for 2 days. The IR spectra of the reaction mixture showed that the signal (1773 cm$^{-1}$) from carbonyl group of ester disappeared and only the signal (1660 cm$^{-1}$) from the carbonyl group of amide remained. The solvent was then removed by a rotary evaporator and the excess triethoxysilyl propyl amine was then removed by evaporation in a vacuum chamber (70° C./1 mm Hg). About 2.1 g of C was obtained.

Step 3—About 2.2 g of the product (C) from Step 2, 5.0 g of silica gel, and 50 mL of N,N-dimethyl formamide were added to a 1 L-three neck round bottom flask. The flask was equipped with a mechanical stirrer, a condenser and a thermometer. The temperature of the mixture was maintained at 135° C. After stirring for 2 days, the reaction mixture was filtered. The resulting tetraamide ligand functionalized silica gel was washed with methanol several times then dried in a vacuum oven at 50–60° C. for 6 hours. About 5.2 g of the product was obtained (D).

Example 3

Synthesis of Ethylenediaminetetraacetamide-n-methylenepropanetetraamine (EDTAAMT) Attached to a Silica Support

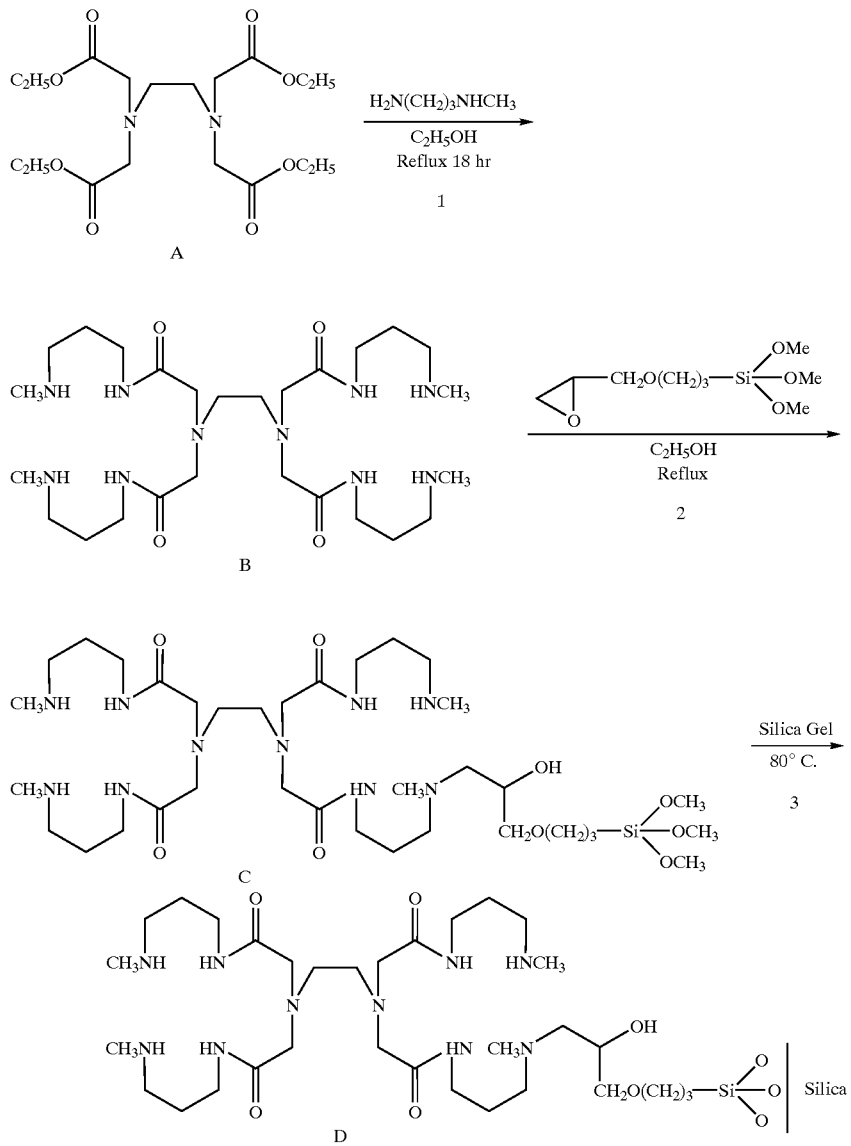

Step 1—About 10 g (75 mMole) of the tetraethyl acetate of ethylenediaminetetraacetic acid (ethyl-EDTA) (A) was dissolved in 200 mL of ethyl alcohol with 88g (1 mole) of N-methyl-1,3-propanediamine and refluxed for 18 hours forming compound B above. The ethyl alcohol and excess diamine was evaporated under vacuum. Additional trace of diamine was evaporated under high vacuum.

Step 2—To the above compound (B) 5.9 g (25 mmole) of 3-glycidoxypropyltrimethoxysilane and 100 mL of ethyl alcohol were added. The mixture was refluxed for 3 hours forming compound C above.

Step 3—About 48 g of silica gel was added and the mixture (C) and was stirred at 78° C. overnight. The product was filtered, washed with ethyl alcohol and dried in a vacuum oven forming a tetraamide ligand functionalized silica gel (D).

Example 4A

Synthesis of Phenyl Substituted Tris(2-aminoethyl)amine Pentaamide (TRENPAM) Attached to a Polystyrene Solid Support

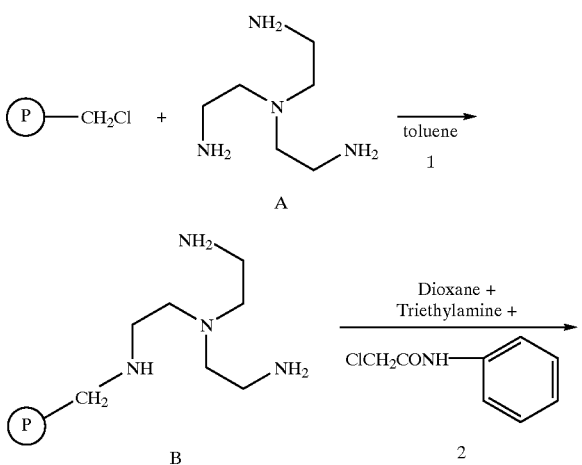

-continued

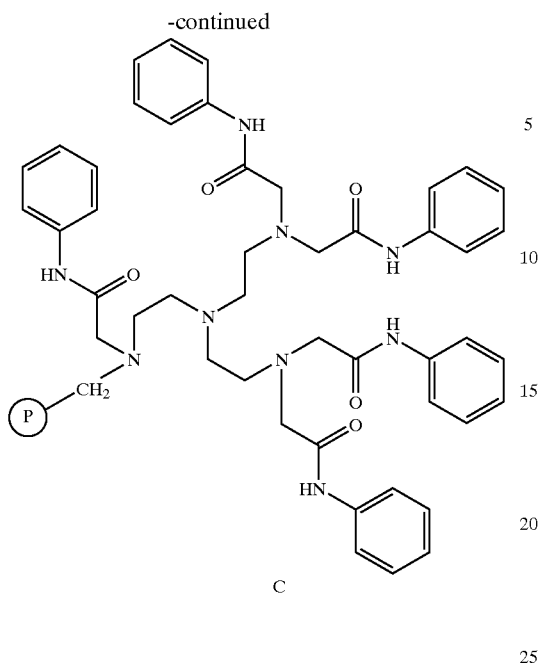

C

Step 1—About 2 g of chloromethyl polystyrene, 2% DVB (Merrifield resin) was mixed with 10 g of tris(2-aminoethyl)amine (TREN), and 15 mL of toluene. The reaction mixture was kept at 80° C. overnight. The resulting functionalized polystyrene solid support (B) was filtered and washed in order with methanol, water, methanol, and then dried under vacuum at 50° C.

Step 2—About 2 g of the derivative of polystyrene functionalized with trisamine (B), was mixed with 3 g of N-phenylchloroacetamide in 25 mL of dioxane and 3 mL of triethylamine. The reaction mixture was mixed overnight at 80° C. The resulting pentaamide ligand functionalized polystyrene support (C) was removed by filtration, washed with dioxane and methanol and dried under the vacuum at 50° C. The product yield was about 2 g.

Example 4B
Synthesis of Dimethyl Substituted Tris(2-aminoethyl)amine Pentaamide (TRENPAM) Attached to a Polystyrene Solid Support -continued

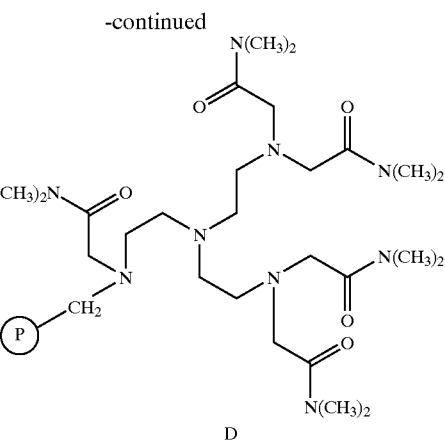

D

Step 3—The dimethyl analog of C above (D) was prepared using the same procedures as above with the substitution of 3 g of N,N-dimethylchloroacetamide in place of N-phenylchloroacetamide in Example 5a, Step 2.

Example 4C

Synthesis of Phenyl Substituted Tris(2-aminoethyl)amine Pentaamide (TRENPAM) Attached to a Silica Support

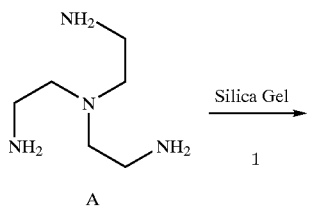

A

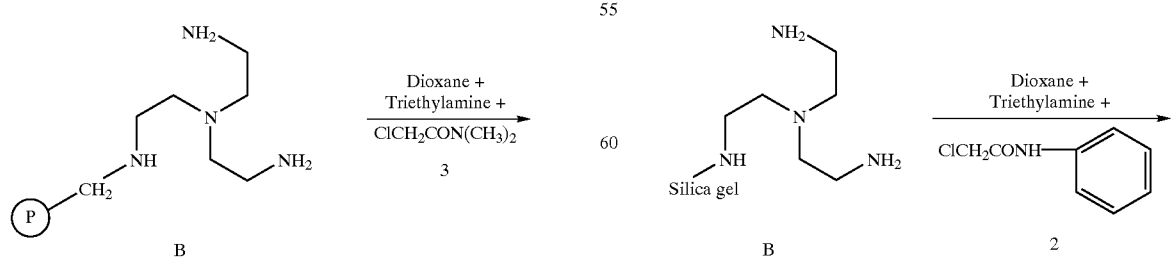

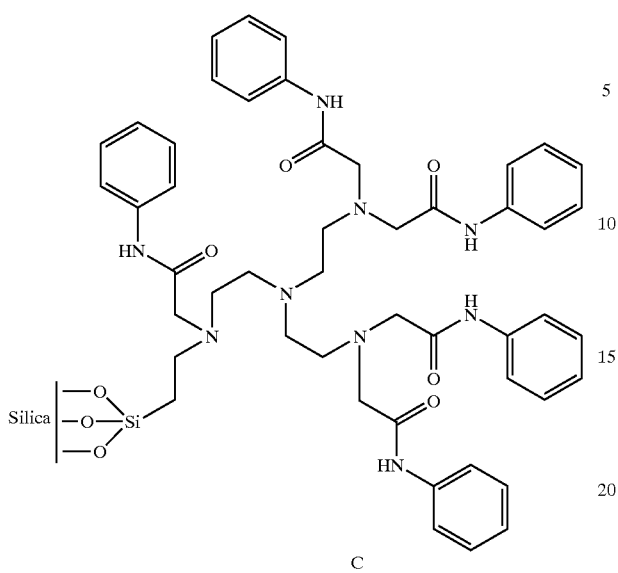

C

Step 1—Tris(2-aminoethyl)amine was attached to silica gel using techniques described in U.S. Pat. No. 4,952,321.

Step 2—About 2 g of the tris(2-aminoethyl)amine functionalized silica gel (B) was added to 25 mL of 1,4-dioxane solution containing 3 g of N-phenylchloroacetamide and 1.8 g of triethylamine. The reaction mixture was mixed overnight at 80° C. The resulting pentaamide ligand functionalized silica gel (C) was filtered and washed with 1,4-dioxane and methanol and dried under vacuum at 50° C. The product yield was about 2.3 g.

Example 4D

Synthesis of Dimethyl Substituted Tris(1-aminoethyl)amine Pentaamide (TRENPAM) Attached to a Silica Support

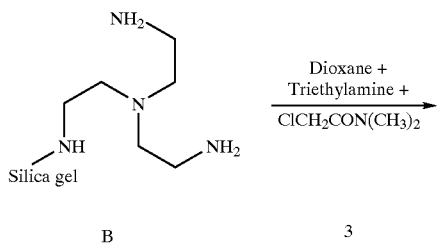

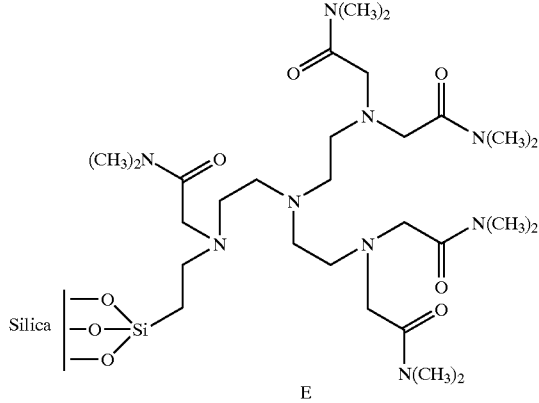

E

Step 3—Functionalized silica gel (E) was prepared using the same procedure as Example 5C, Step 2, above with the substitution of 3 g of N,N-dimethylchloroacetamide for N-phenylchloroacetamide.

Examples 5–8

Concentration of Desired Ions with Polyamide-Containing Ligating Agents Bonded to Solid Supports The following examples demonstrate how the polyamide-containing ligating agents of Formula 9 may be used to remove and concentrate desired ions.

Example 5

Separation Using EGTAM Attached to Silica Support

About 0.05 g of the EGTAM attached to silica as shown in Example 1 was placed in a column. A 25° C., 10 mL source solution consisting of 1M KCl, 20 ppm Cu(II), 20 ppm Pb(II) and 0.05 ppm Cd(II) in $H_2O$ was drawn through the column. A 5 mL aqueous solution of 0.2 M glycine and 0.4 M potassium citrate at 25° C. was then passed through the column to wash out the loading solution remaining in the column. The Cd(II) was then eluted with 5 mL of 25° C., 0.7 M glycine. Analysis of the above solutions by Atomic Absorption Spectroscopy (AA) showed that greater than 98% of the Cd(II) originally in the source solution described above was in the receiving solution. Furthermore, the Cu, Fe, and Pb levels in the receiving liquid were less than 1 ppm.

Example 6

Separations Using EGTAM Attached to Solid Support

About 1.0 g of the EGTAM attached to silica as shown in Example 1 was placed in a column. At 25° C., a 3 mL source solution of 3204 ppm Cd(II) and 65 g/L Zn in pH 2 water plus $H_2SO_4$ was drawn through the column. A 4 mL aqueous solution of 0.01 M $H_2SO_4$ at 25° C. was then passed through the column to wash out the loading solution remaining in the column. The Cd(II) was then eluted with 1 mL of 25° C., 1 M $H_2SO_4$. Analysis of the above solutions by Inductively Coupled Plasma Spectroscopy (ICP) showed that 25% of the Cd(II) from the feed was in the receiving solution for a cadmium level of 2400 ppm and the Zn level in the receiving solution was only 40 ppm.

Example 7

Separations Using EDTAM Attached to Silica Solid Support

In this example 0.1 g of the EDTAM attached to silica gel as shown in Example 4B was placed in a column. A 25° C., 10 mL source solution of 65 ppm Cu in 0.01 M HCl was drawn through the column. The Cu was then eluted with 5 mL of 25° C., 1 M $H_2SO_4$. Analysis of the above solutions by Inductively Coupled Plasma Spectroscopy (ICP) showed that greater than 95% of the Cu originally in the 10 mL solution described above was in the 5 mL receiving solution. Furthermore, a full loading curve experiment with 100 mL of the same source solution resulted in a subsequent removal of 0.02 mMole $Cu^{2+}$ from the receiving solution.

Example 8—Separations Using Tris Amine Amide Attached to Polystyrene Solid Support About 0.1 g of the tris amine amide as shown in Example 4B was placed in a column. A 25° C., 1 mL source solution of 290 ppm Pb(II) and 100 g/L Ag(I) in 0.1 M $HNO_3$ was drawn through the column. A 2 mL aqueous solution at 25° C. was then passed through the column to wash out the loading solution remaining in the column. The Pb(II) was then eluted with 2 mL of 25° C., 5 M $HNO_3$. Analysis of the above solutions by Atomic Adsorption Spectroscopy (AA) showed that greater than 98% of the Pb(II) originally in the 1 mL solution described above was in the 2 mL receiving solution. Furthermore, the Ag(I) level in the receiving liquid was less than 1 ppm.

Although the invention has been described and illustrated with reference to certain specific embodiments falling within the scope of Formula 9, other embodiments may be practiced. For example, other analogs of these polyamide-containing ligating compounds and methods of using the same are also within the scope of the invention. The invention is therefore limited only in scope by the following claims and functional equivalents thereof.

We claim:

1. A composition for selectively binding metal ions comprising a polyamide-containing ligand covalently bonded to a particulate solid support through a hydrophilic spacer, said composition having the formula:

SS—A—X—L wherein SS is a particulate solid support, A is a covalent linkage mechanism, X is a hydrophilic spacer grouping, and L is a substituted or unsubstituted polyamide-containing ligand selected from the group consisting of dioxatetraamide ethylene [bis(oxyethylenenitrilo)tetraacetic acid (EGTAM)], diaza-1 8-crown-6-tetraamide, ethylenediaminetetraacetamide-N-methylenepropanetetraamine (EDTAAMT), tris(2-aminoethyl)amine pentaamide (TRENPAM), and diethylentriaminepentaacetamide (DTPAM), with the proviso that when SS is a particulate organic polymer, A—X may be combined as a single covalent linkage.

2. A composition according to claim 1, wherein L is dioxatetraamide.

3. A composition according to claim 1, wherein L is diaza-18-crown-6-tetraamide.

4. A composition according to claim 1, wherein L is ethylenediaminetetraacetamide-N-methylenepropanetetraamine (EDTAAMT).

5. A composition according to claim 1, wherein L is tris(2-aminoethyl)amine pentaamide (TRENPAM).

6. A composition according to claim 1, wherein L is dimethyl substituted tris(2-aminoethyl)amine pentaamide (TRENPAM).

7. A composition according to claim 1, wherein L is phenyl substituted tris(2-aminoethyl)amine pentaamide (TRENPAM).

8. A composition according to claim 1, wherein L is diethylenetriaminepentaacetamide (DTPAM).

9. A composition according to claim 1 wherein SS is a particulate polymeric organic solid support matrix selected from the group consisting of polyacrylate, polystyrene, polyphenol and mixtures thereof.

10. A composition according to claim 9 wherein A and X combined are represented by the formula:

—$(CH_2)_x$—$(Y)_y$—$(CH_2)_z$— where y is an integer of 0 or 1; x and z are independently integers between 0 and 10; and Y is member selected from the group consisting of O, S, C=N, CO, CONH, CSNH, COO, CSO, NH, NR, SO, $SO_2$, $SO_2NH$, $C_6H_4$ and $CH_2C_6H_4$ where R is lower alkyl with the proviso that at least one of x, y and z must be at least 1.

11. A composition according to claim 1 wherein SS is a inorganic solid support selected from the group consisting of sand, silica gel, glass, glass fibers, alumina, zirconia, titania, nickel oxide and mixtures thereof.

12. A composition according to claim 11 wherein A is a member selected from the group consisting of Si(Z,Z)—O, wherein Z can independently represent members selected from the group consisting of Cl, Br, I, lower alkyl, lower alkoxy, substituted lower alkyl or substituted lower alkoxy and O—SS.

13. A composition according to claim 12 wherein X is a member represented by the formula:

$(CH_2)_a(OCH_2CHR^1CH_2)_b$ wherein $R^1$ is a member selected from the group consisting of H, SH, OH, lower alkyl, and aryl; a is an integer from 2 to about 10; and b is 0 or 1.

14. A composition according to claim 13 wherein the —$CH_2$— group of said spacer (X) which is most distal to said solid support (SS) is covalently bonded to an amide group of said ligand (L) wherein said amide group is represented by the formula:

—$(NH)_m(CH_2)_nC(O)(NH)_n(CH_2)_m$ where m is 0 or 1; and n is 0 or 1 with the proviso that when m is 1, n is 0 and when m is 0, n is 1.

15. A composition according to claim 13 wherein the —$CH_2$— group of said spacer (X) which is most distal to said solid support (SS) is covalently bonded to an amine nitrogen.

* * * * *